(12) United States Patent
Hamada et al.

(10) Patent No.: US 9,092,669 B2
(45) Date of Patent: Jul. 28, 2015

(54) IMAGE PROCESSING APPARATUS FOR PROCESSING PHOTOGRAPHED IMAGES

(71) Applicant: CASIO COMPUTER CO., LTD., Shibuya-ku, Tokyo (JP)

(72) Inventors: Akira Hamada, Sagamihara (JP); Yoshihiro Teshima, Higashimurayama (JP); Naotomo Miyamoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/015,978

(22) Filed: Aug. 30, 2013

(65) Prior Publication Data

US 2014/0063569 A1    Mar. 6, 2014

(30) Foreign Application Priority Data

Sep. 6, 2012    (JP) ................................. 2012-195925

(51) Int. Cl.
| | |
|---|---|
| H04N 1/04 | (2006.01) |
| H04N 1/00 | (2006.01) |
| G06K 9/00 | (2006.01) |
| G06K 9/32 | (2006.01) |
| G06K 9/36 | (2006.01) |

(52) U.S. Cl.
CPC .......... *G06K 9/00463* (2013.01); *G06K 9/3216* (2013.01); *G06K 2009/363* (2013.01)

(58) Field of Classification Search
CPC ....... H04N 1/193; H04N 1/17; H04N 1/0402; H04N 1/1013; H04N 1/12; H04N 2201/1016; H04N 2201/0425; H04N 1/00681; H04N 2201/00766; H04N 2201/0756; H04N 1/1017
See application file for complete search history.

(56) References Cited

U.S. PATENT DOCUMENTS

| | | | | |
|---|---|---|---|---|
| 5,663,806 | A  * | 9/1997 | Grise et al. ..................... | 358/406 |
| 6,721,465 | B1 * | 4/2004 | Nakashima et al. .......... | 382/318 |
| 2004/0032428 | A1 * | 2/2004 | Pilu et al. ....................... | 345/764 |
| 2008/0212150 | A1 * | 9/2008 | Bremm et al. ................ | 358/488 |
| 2010/0328270 | A1 * | 12/2010 | Lin et al. ........................ | 345/175 |
| 2014/0063576 | A1 * | 3/2014 | Hamada et al. ............... | 358/504 |

FOREIGN PATENT DOCUMENTS

| | | |
|---|---|---|
| JP | 2010-130181 A | 6/2010 |
| JP | 2012-108720 A | 6/2012 |

* cited by examiner

*Primary Examiner* — Cheukfan Lee
(74) *Attorney, Agent, or Firm* — Holtz, Holtz, Goodman & Chick PC

(57) ABSTRACT

An image processing apparatus acquires a photographed image of an object on which a plurality of indicators have been arranged, recognizes an indicator in the photographed image, detects a position of the indicator, judges a timing at which a state of the object is changed to a predetermined state based on a change in the detected position of the indicator with respect to respective sequentially acquired images, and judges a state of the photographed image based on detected positions of the plurality of indicators with respect to a photographed image acquired at the judged timing at which the state of the object is changed to the predetermined state.

14 Claims, 12 Drawing Sheets

IMAGE PROCESSING APPARATUS FOR PROCESSING PHOTOGRAPHED IMAGES

CROSS-REFERENCE TO RELATED APPLICATION

This application is based upon and claims the benefit of priority from the prior Japanese Patent Application No. 2012-195925, filed Sep. 6, 2012, the entire contents of which are incorporated herein by reference.

BACKGROUND OF THE INVENTION

1. Field of the Invention

The present invention relates to an image processing apparatus for processing photographed images, an image processing method and a storage medium in which a program is stored.

2. Description of the Related Art

In general, image processing apparatuses in which information (characters, figures, and the like) described on a paper medium (for example, notebooks or books) is read and stored reads image data by scanning the paper medium with a scanner or reads photographed images by photographing the paper medium with a digital camera.

Conventionally, as a reading technology in which a paper medium is taken on a digital camera, a technology has been proposed in which, with respect to a notebook computer whose first housing and second housing are rotatably (openably and closably) attached via a hinge section, a document (paper medium) placed in the vicinity of the first housing is photographed by the digital camera arranged on the side of the second housing, and trapezoid distortion correction is applied to the photographed image (see Japanese Patent Application Laid-Open (Kokai) Publication No. 2010-130181).

SUMMARY OF THE INVENTION

In accordance with one aspect of the present invention, there is provided an image processing apparatus comprising: an acquisition section which acquires a photographed image of an object on which a plurality of indicators have been arranged; a detection section which recognizes an indicator in the photographed image acquired by the acquisition section and detects a position of the indicator; a first judgment section which judges a state of the object based on the position of the indicator detected by the detection section; and a second judgment section which, when the state of the object judged by the first judgment section is a predetermined state, judges a state of the photographed image based on a positional relationship of the plurality of indicators detected by the detection section.

In accordance with another aspect of the present invention, there is provided an image processing method comprising: a step of acquiring a photographed image of an object on which a plurality of indicators have been arranged; a step of recognizing an indicator in the acquired photographed image and detecting a position of the indicator; a step of judging a state of the object based on the detected position of the indicator; and a step of judging a state of the photographed image based on a detected positional relationship of the plurality of indicators, when the judged state of the object is a predetermined state.

In accordance with another aspect of the present invention, there is provided a non-transitory computer-readable storage medium having stored thereon a program that is executable by a computer, the program being executable by the computer to perform functions comprising: processing for acquiring a photographed image of an object on which a plurality of indicators have been arranged; processing for recognizing an indicator in the acquired photographed image and detecting a position of the indicator; processing for judging a state of the object based on the detected position of the indicator; and processing for judging a state of the photographed image based on a detected positional relationship of the plurality of indicators, when the judged state of the object is a predetermined state.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
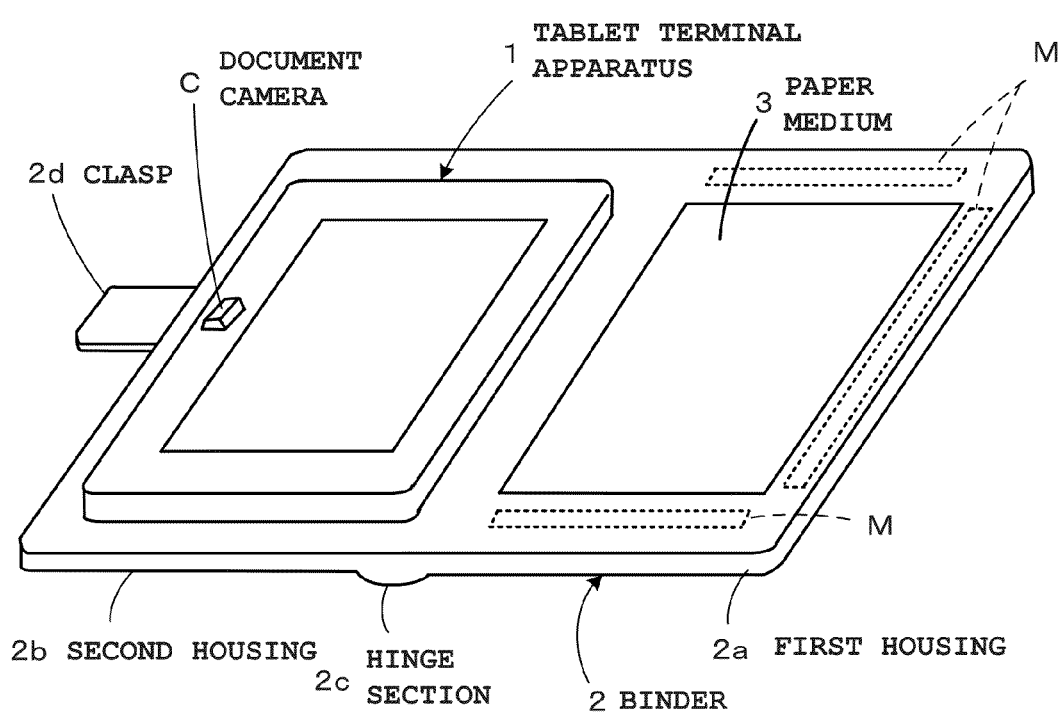
FIG. 1 is a schematic perspective view of an image processing apparatus of an open-and-close type in an opened state.
Figure 2:
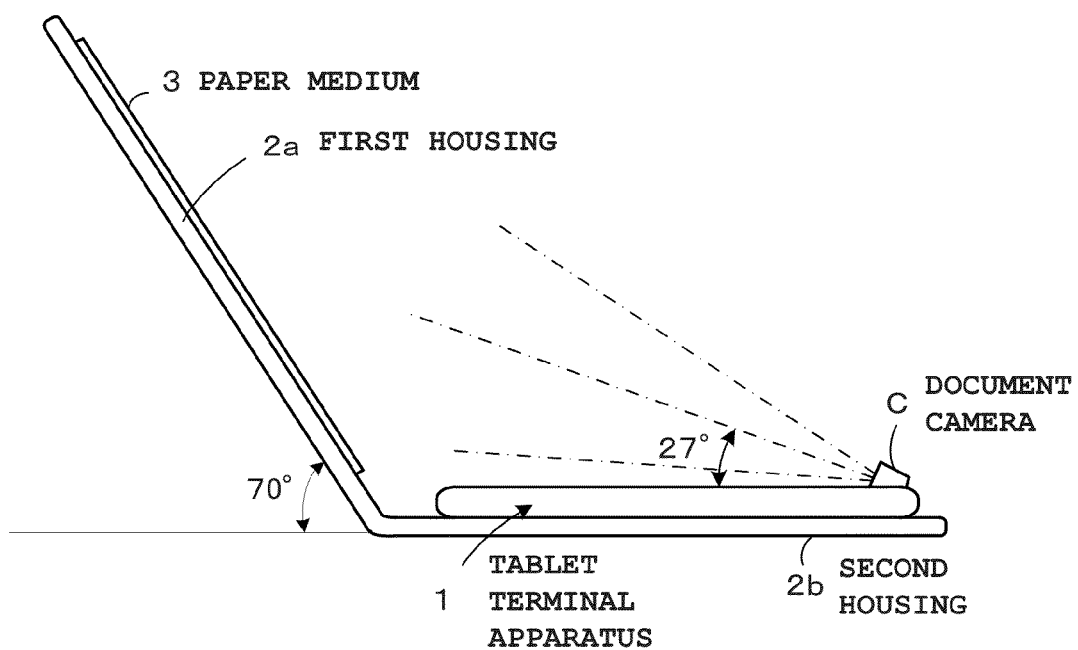
FIG. 2 is a diagram to describe a state when the image processing apparatus is opened to photograph an object.

Hereinafter, the embodiment of the present invention will be described below referring to FIGS. 1 to 12. FIG. 1 is a schematic perspective view of an image processing apparatus of an open-and-close type (unfolded type) in an opened state. FIG. 2 is a schematic external view of the image processing apparatus in the opened state when viewed from the one-side surface, which is a diagram to describe a state when the image processing apparatus is opened to photograph an object. The image processing apparatus is structured to include a tablet terminal apparatus 1 having an imaging function (digital camera), and a binder 2 on which the tablet terminal apparatus 1 is attached, and the entire housing thereof has a binding structure which is openable and closable (openable at its center). The tablet terminal apparatus 1 is integrally attached to the binder 2 which is openable and closable. In this case, the tablet terminal apparatus 1 may detachably be attached to the binder 2 with the use of fixtures (not illustrated) such as bands.

The tablet terminal apparatus 1, which is formed in a slim, rectangular parallelepiped as a whole, is a portable information terminal apparatus having, for example, an A5 size. The tablet terminal apparatus 1 has an image reading function to optically read information (characters, diagrams, and images) described on a paper medium 3 (for example, notes, report paper, and books) placed in close proximity of the tablet terminal apparatus 1, by photographing the paper medium 3 as an object, in addition to basic functions such as a touch input function and a wireless communication function. In the embodiment of the present invention, the paper medium 3 is represented by a medium on which information to be photographed is described, which is not limited to materials made of paper. This means that the paper medium 3 includes electronic paper in which information can electronically be displayed.

The binder 2 is constituted by a first housing 2a and a second housing 2b which are openable to be in an unfolded state, centering on a hinge section 2c (connection section) provided therebetween. In the example illustrated, the first housing 2a is arranged on the right side, and the second housing 2b is arranged on the left side. However, the first housing 2a and the second housing 2b may be arranged at the inverted position, compared with positional relation illustrated in the diagram. The first housing 2a and the second housing 2b are made up of a plate member (for example, thick paper) of a thick flat-plate rectangle (identical in shape and size) which is bonded with a synthetic resin sheet, and openably and closably connected, centering on the hinge section 2c as a rotation axis.

The first housing 2a and the second housing 2b are openable and closable, ranging from an opened state where the angle between the first housing 2a and the second housing 2b is at 180 degrees as illustrated, to an overlapped state where the second housing 2b fittingly lies on top of the first housing 2a (fully closed state). In a state where the binder 2 has been opened at 180 degrees, a user can use the tablet terminal apparatus 1 and write characters or depict diagrams on the paper medium 3. Also, when the tablet terminal apparatus 1 and the paper medium 3 are not used, the first housing 2a and the second housing 2b are fixed with a clasp 2d, thereby preventing the binder 2 from being opened. Also, the paper medium 3 is placed on the first housing 2a, and the tablet terminal apparatus 1 is placed on the second housing 2b. Also, on the surface side of the tablet terminal apparatus 1, a document camera C which photographs the whole of the first housing 2a as an object and optically reads information (characters, diagrams, images, and the like) described on the paper medium 3 is provided at of the hinge section 2c.

The document camera C is attached in such a manner that the optical axis thereof is kept at a predetermined angle (for example, elevation angle of 27 degrees) with respect to the surface (flat surface) of the tablet terminal apparatus 1. Also, the viewing angle of the document camera C is set in such a manner that the whole of the first housing (object) 2a placed opposite to the document camera C is included in the photographing range when the angle of the first housing 2a with respect to the second housing 2b is within a range of predetermined angles. When the angle of the first housing 2a with respect to the second housing 2b is within the range of predetermined angles, the focus position of the document camera C is set on the side of the far end portion with respect to the central portion of the flat surface (the central portion of the object) of the first housing 2a. Note that the attachment angle (elevation angle of 27 degrees), the viewing angle, and the focus position of the document camera C are set in such a manner that the entire first housing (object) 2a is included in the photographing range, and that the resolution of the object from the side of the far end portion to the side of the near end portion of the first housing 2a (for example, pixel density or contrast regarding the portion of the object, which is necessary to perform character recognition) is equal to or higher than a predetermined value. However, needless to say, the predetermined value is not limited to the elevation angle of 27 degrees, but can appropriately be changed corresponding to the number of pixels to be photographed by the document camera C, the depth of field, and other conditions.

When the angle of the first housing 2a with respect to the second housing 2b comes within the range of the predetermined angles, the tablet terminal apparatus 1 acquires a photographed image of the entire first housing (object) 2a from the document camera C, as a storage target image. For example, as is illustrated in FIG. 2, in a state where the second housing 2b has been placed on the surface of a desk (state where the tablet terminal apparatus 1 has been horizontally placed), when an angle at which the first housing 2a obliquely stands (the tilt angle of the first housing 2a) comes within the range of predetermined angles, that is, when the optimal angle at which the paper medium 3 is photographed is, for example, 70 degrees, and the tilt angle of the first housing 2a comes within the range of predetermined angles (65 to 75 degrees) which are close (plus or minus 5 degrees) to the optimal angle, a photographed image of the entire first housing 2a is acquired from the document camera C as a storage target image.

Also, it can be utilized such that the second housing 2b obliquely stands with the first housing 2a being placed on the surface of the desk and the like. Here, in both of the utility modes above, the range of the angles (65 to 75 degrees) of the first housing 2a with respect to the second housing 2b is the range of angles at which the user suitably carries out an operation of photographing the paper medium 3 while watching the screen (touch display section on the surface side of the tablet terminal apparatus 1, which is described later) of the tablet terminal apparatus 1 (in which an operation screen for photographing the paper medium 3 or a photographed images of the document camera C are displayed in real time). Then, the attachment angle (elevation angle of 27 degrees) of the document camera C is set in accordance with the range of the angles (65 to 75 degrees) of the first housing 2a with respect to the second housing 2b. When the binder 2 in an opened state is closed, and the tilt angle of the first housing 2a comes within the range of the predetermined angles (65 to 75 degrees), a clicking sound along with a sense of hooking is emitted by the action of a locking mechanism (not illustrated) in the hinge section 2c. The binder 2 can fully be closed by moving the first housing 2a further against the sense of hooking.

The paper medium 3 on the first housing 2a may be sheet-shaped like a sheet of paper or book-shaped like books. The paper medium 3 is detachably mounted on the first housing 2a, thereby being freely replaced. Note that the tablet terminal apparatus 1 includes a positioning mechanism in which the positional relation between the paper medium 3 of a predetermined size and the first housing 2a is put into a predetermined state. As long as the positional relation can be put into the predetermined state, the way by which the paper is mounted is arbitrary. For example, the four corners of the paper medium 3 may be fastened on the surface of the first housing 2a. Also, a plurality of marks (indicators) M are arranged on the outer side of the surface of the first housing 2a in a manner to surround the paper medium 3. That is, the plurality of marks M are arranged (formed in print) in a row with a predetermined regularity in the peripheral portion of the paper medium 3 in a manner to surround the paper medium 3. The plurality of marks M, which will be described in detail later, are indicators for state judgment which are used when the state of the first housing 2a (object) is judged, or the state of the photographed image is judged.

Figure 3:
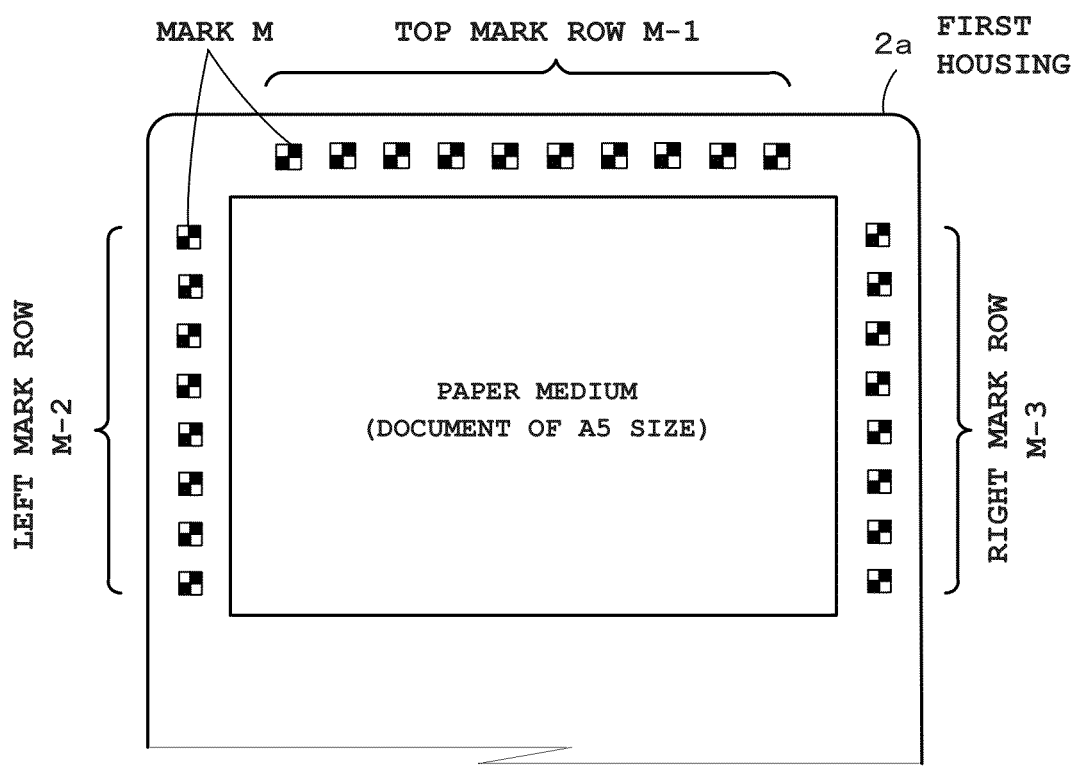
FIG. 3 is a diagram to describe a plurality of marks M formed in print on the surface of a first housing 2a (object)

FIG. 3 is a diagram to describe the plurality of marks M formed in print on the surface of the first housing 2a. On the surface (on the flat surface to be opened) of the first housing 2a, the plurality of marks M are linearly formed in print along the end sides of the first housing 2a on the end portion on the opposite side of the hinge section 2c. In the example illustrated, the plurality of marks M are arranged on the upper area of the first housing 2a. Accordingly, the plurality of marks M arranged on the upper area are generically named as a top mark row (first indicator) M-1 for convenience of explanation. Also, the plurality of marks M which are linearly arranged along the end sides of the first housing 2a are formed in print on both end portions the first housing 2a on the flat surface of the first housing 2a to be opened. In the example illustrated, the plurality of marks M are arranged in the left portion area and the right portion area of the first housing 2a. Accordingly, the plurality of marks M arranged in the left portion area and the right portion area of the first housing 2a are generically named as a left mark row (second indicator) M-2 and a right mark row (second indicator) M-3, respectively.

Each mark is illustrated in a checkered pattern in which the squares of two colors (black and white) are alternately arranged and the two-color (black and white) squares are arranged in the form of two-by-two matrix. Also, the top mark row M-1 is configured such that 10 marks M which are equal in size and shape are linearly arranged at regular intervals. The left mark row M-2 and the right mark row M-3 are configured such that eight marks M which are equal in size and shape are linearly arranged at regular intervals. Thus, on the surface (flat surface to be opened) of the first housing 2a, the top mark row M-1, the left mark row M-2, and the right mark row M-3 are arranged in a manner to surround the peripheral portion (three sides) of the paper medium 3 having, for example, an A5 size. Note that the number of the marks M is not limited to the aforementioned example, and can be arbitrarily determined corresponding to the size of the paper medium 3 and the size of the marks M. In this embodiment, the number of the marks M of each row has been determined such that the marks M are prevented from being partially unrecognizable due to a reflected ray on the first housing 2a or the torsion of the entire first housing 2a, and that attractive design is provided.

The tablet terminal apparatus 1 acquires an image of the first housing 2a photographed by the document camera C as an object, analyzes the photographed image, recognizes the marks M in the photographed image, detects the position of the marks M, and judges the state of the first housing 2a (object) based on the position of the marks M. That is, the tablet terminal apparatus 1 recognizes the top mark row (first indicator) M-1 in the photographed image, and detects the position of the marks M of the top mark row. Then, based on each mark position of the top mark row M-1, the tablet terminal apparatus 1 judges whether it is a state where an angle between the first housing 2a (object) and the document camera C is within the range of the predetermined angles, as the state of the first housing 2a (object). In the embodiment of the present invention, a state where the tilt angle of the first housing 2a comes within the range of predetermined angles (for example, 65 to 75 degrees) is judged as the state of the object.

Note that, although the tilt angle of the first housing 2a has been taken as the angle indicating the state of the first housing 2a (object), the present invention is not limited thereto. As an angle corresponding to the tilt angle; an angle at which the optical axis of the document camera C is intersected with the surface (flat surface to be opened) of the first housing 2a (object), or an open angle between the first housing 2a and the second housing 2b may be applied. In the embodiment of the present invention, the tilt angle of the first housing 2a is taken as the angle indicating the state of the first housing 2a.

Then, when judged that it is the state where the tilt angle of the first housing 2a is within the range of the predetermined angles as described above, the tablet terminal apparatus 1 judges the state of the photographed image based on the positional relation of the plurality of marks M in the photographed image. That is, the top mark row (first indicator) M-1, the left mark row (second indicator) M-2, and the right mark row (second indicator) M-3 in the photographed image are detected, and the distortion status of the photographed image, that is, the status of geometrical image distortion which changes corresponding to the photographing angle or the torsion is judged based on the positional relation of the detected top mark row (first indicator) M-1, left mark row (second indicator) M-2, and right mark row (second indicator) M-3. Then, based on the distortion status of the image judged thereby, projective transformation processing (trapezoid distortion correction processing can be applied when there is no torsion) is carried out for the photographed image, and the image after the projective transformation is designated as a subject to be stored. Here, even when a slight detection error is included in the result of the detection of the top mark row M-1, the left mark row M-2, and the right mark row M-3, correct geometrical transformation parameters are assumed based on only the correct results, and thereby the projective transformation processing (trapezoid distortion correction processing) is carried out.

Figure 4:
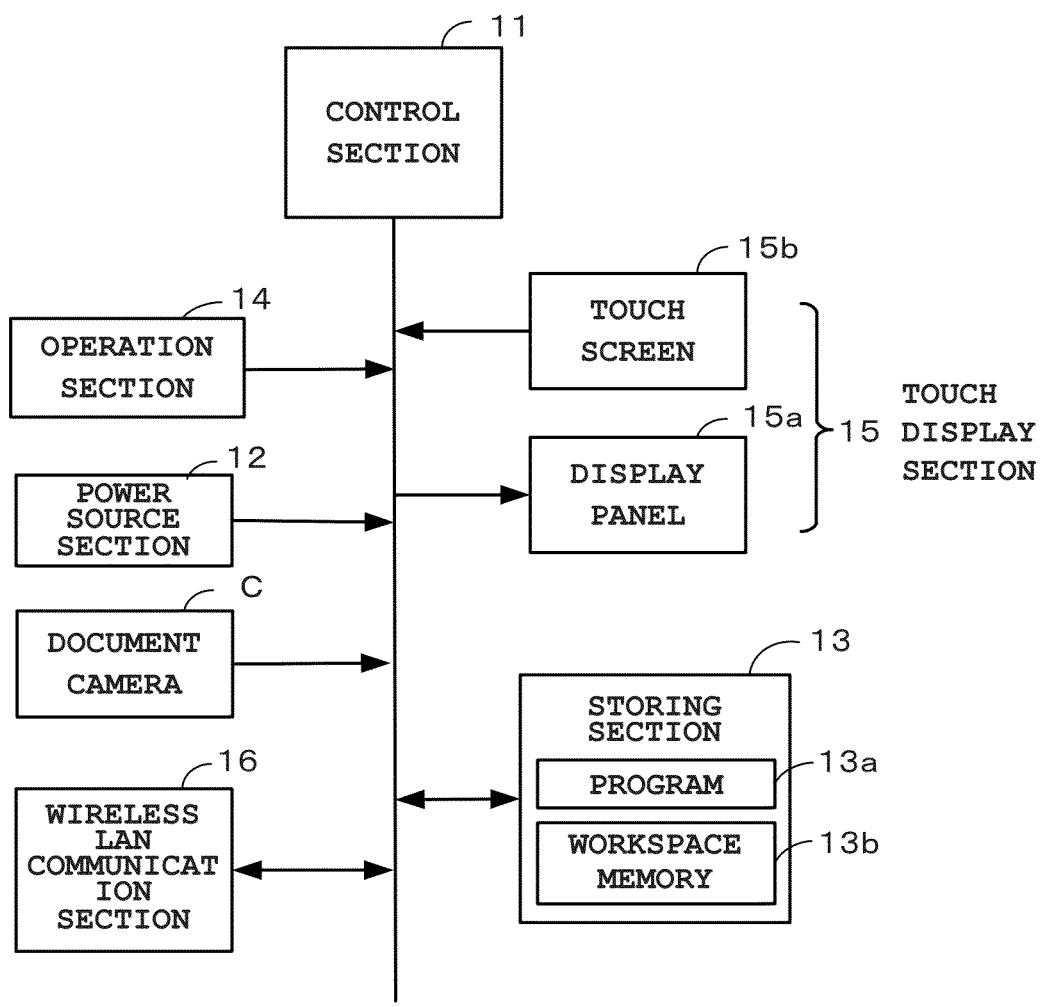
FIG. 4 is a block diagram illustrating the basic components of a tablet terminal apparatus 1.

FIG. 4 is a block diagram illustrating the basic components of the tablet terminal apparatus 1. A control section 11 is operated by electric power supplied from a power source section (secondary battery) 12 and controls the entire operation of the tablet terminal apparatus 1 in accordance with various programs stored in a storing section 13. A CPU (Central Processing Unit) and a memory not illustrated are provided in this control section 11. The storing section 13 is configured to include a ROM and a flash memory, and has a program memory 13a which stores programs and various applications to realize the embodiment of the present invention according to the operational procedures illustrated in FIGS. 5 to 8, and a workspace memory 13b which temporarily stores various information (for example, flags) required to operate the tablet terminal apparatus 1. Note that the storing section 13 may include, for example, a detachable, portable memory (storage media) such as an SD (Secure Digital) card and an IC (Integrated Circuit) card. Although not illustrated, in a case where the storing section 13 is connected to a network via a communication function, the storing section 13 may include a storage area on the side of a predetermined server apparatus.

The operation section 14 includes, although its illustration is omitted, a power key to turn on/off the power source and a mode key by which the tablet terminal apparatus 1 is switched to a document mode (operation mode), and the document camera C is activated. A touch display section 15 is constituted such that a touch screen 15b is arranged to be layered on a display panel 15a. The display panel 15a is a high definition liquid crystal display having a screen with an uneven aspect ratio (for example, 4:3 [width to height]). The touch screen 15b is constituted by a touch screen which detects the position of a finger of a photographer who is touching the touch screen 15b and inputs the coordinate data of the position. For example, an electrostatic capacity method or a resistive membrane method is applied to the touch screen 15b, but another method may be applied.

The document camera C, which constitutes an image reading function, includes a taking lens, image sensor elements, various sensors, an analog processing section, and a digital processing section, and serves as a digital camera section in which an object image from an optical lens not shown is formed by image sensor elements such as a CCD (Charge Coupled Device) or a CMOS (Complementary Metal Oxide Semiconductor) and whereby the object is photographed in high definition. The document camera C has an automatic focusing function and the like. As illustrated in FIG. 2, when the first housing 2a is standing, the focus position of the document camera C is set on a point on the far end side which is slightly away from the central portion of the surface (flat surface to be opened) of the first housing 2a due to the following reasons. That is, characters on the near end side are projected larger than characters on the far end side, so that the characters on the near end side are relatively easily recognized even when it is slightly blurred. However, when the characters on the far end side become blurred, it is hard to recognize them. Accordingly, in view of easiness of the recognition regarding the characters on the near end side and the far end side, the focus position is set on the far end side which is slightly away from the central portion (central portion of an object) of the flat surface to be opened. A wireless LAN (Local Area Network) communication section 16 is a wireless communication module which can perform high-speed, large capacity communication and can be connected to a nearest wireless LAN router (not illustrated) via the Internet.

Next, the operation concept of the image processing apparatus (tablet terminal apparatus 1) according to the embodiment of the present invention will be described referring to flowcharts illustrated in FIGS. 5 to 8. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. FIGS. 5 to 8 are flowcharts outlining the operation of a characteristic portion of the present embodiment from among all of the operations of the image processing apparatus (tablet terminal apparatus 1). After exiting the flows of FIGS. 5 to 8, the control section 11 returns to the main flow (not illustrated) of the entire operations.

Figure 5:
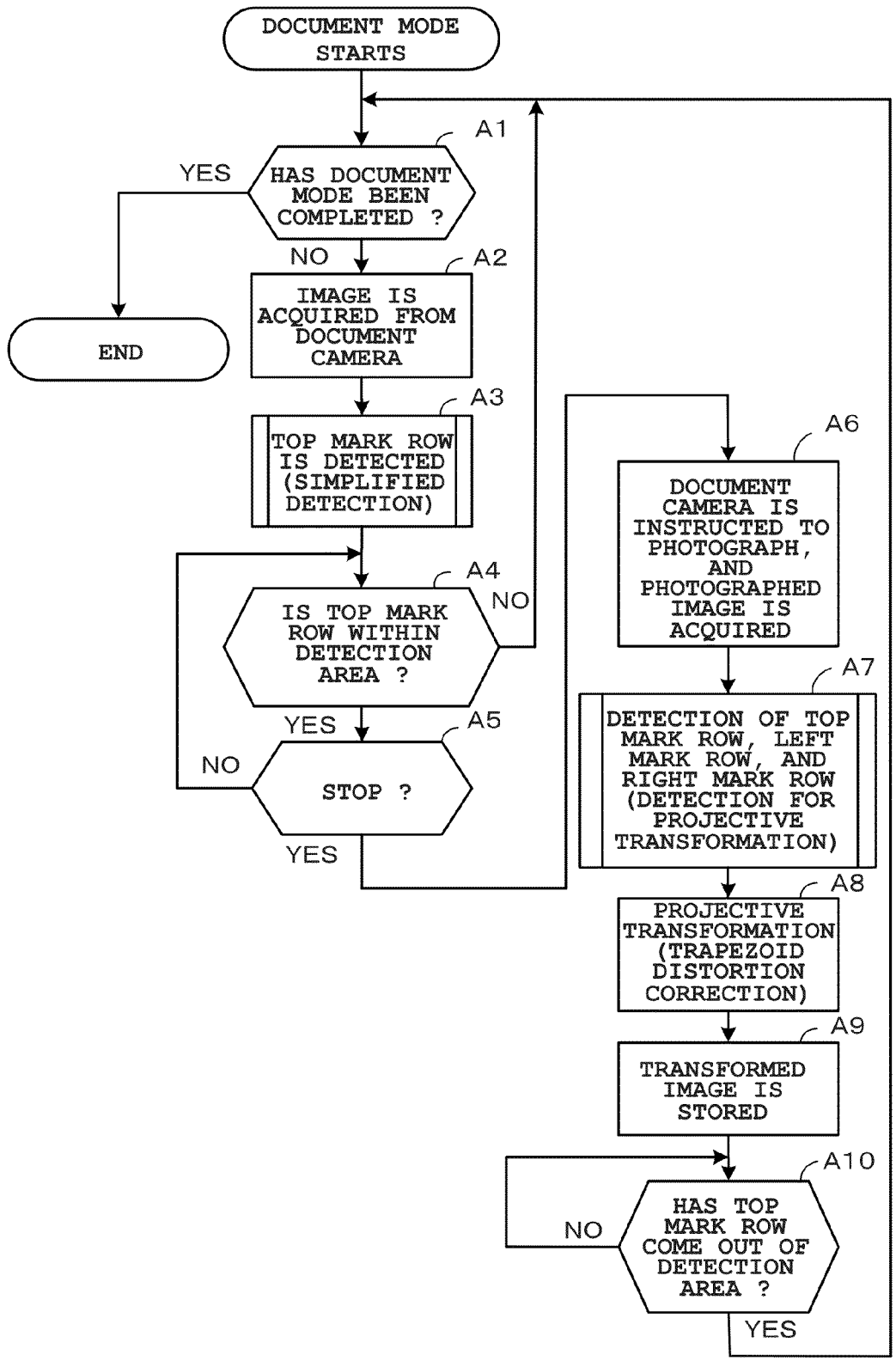
FIG. 5 is a flowchart to describe the operation (characteristic operation of the embodiment of the present invention) of the image processing apparatus which is started in response to the start of the operation of a document camera C.

FIG. 5 is a flowchart to describe the operation (characteristic operation of the embodiment of the present invention) of the image processing apparatus (tablet terminal apparatus 1) which is started when the image processing apparatus is switched to the document mode by a mode key operation. First, the control section 11 of the tablet terminal apparatus 1 judges whether or not the document mode has been canceled (whether or not the document mode has been ended) by the operation of the mode key in the document mode (Step A1). When judged that the tablet terminal apparatus 1 is currently in the document mode (Step A1, NO) the control section 11 acquires an image (through image, or live-view image) from the document camera C (Step A2), analyzes the acquired image, and then carries out the top-mark-row detection processing for detecting the top mark row M-1 (Step A3). In some cases, the top-mark-row detection processing is also referred to as simplified detection processing because its detection is simple, compared with the detection for projective transformation described later.

Figure 6:
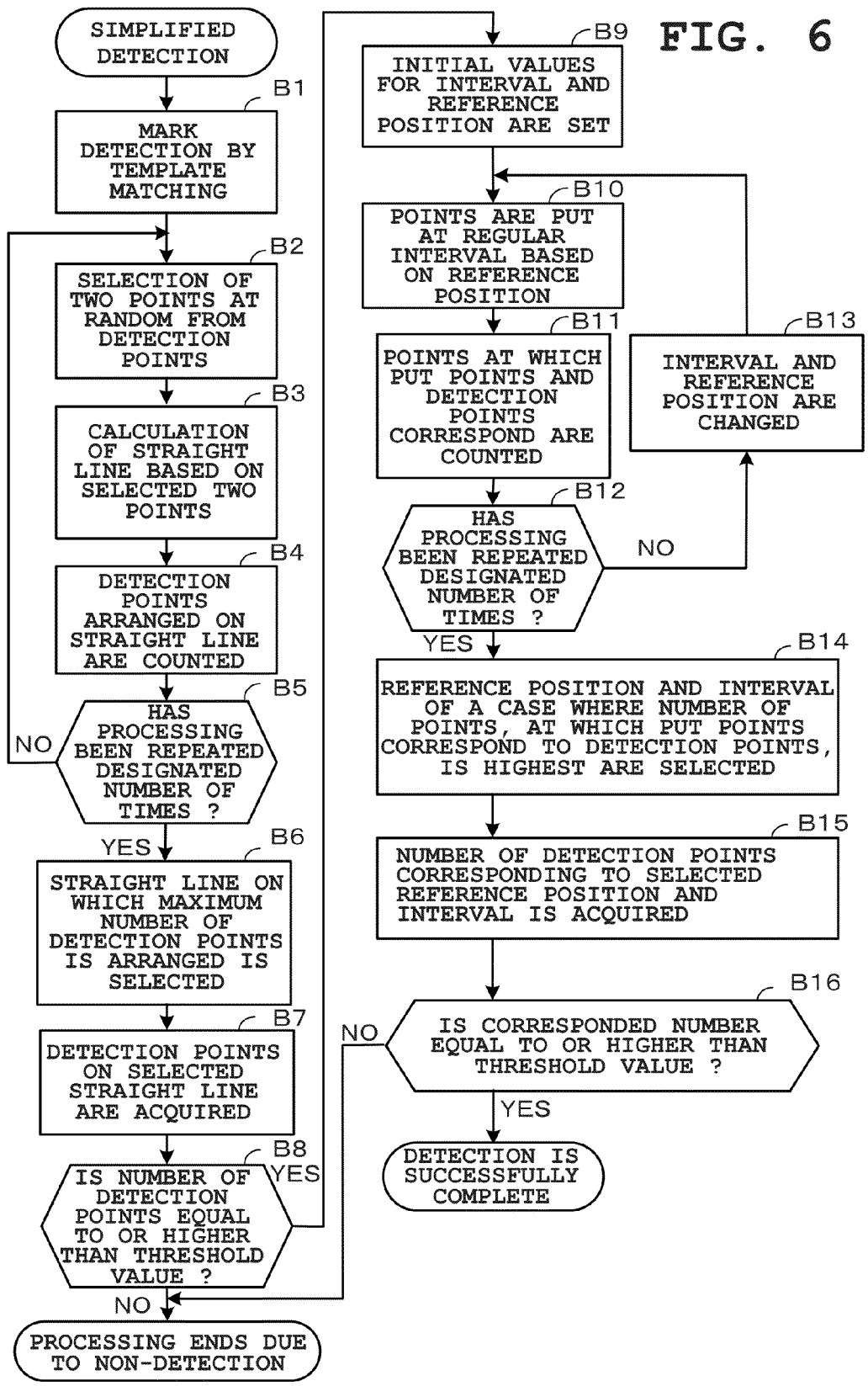
FIG. 6 is a flowchart to describe processing for detecting a top mark row in detail (simplified detection processing at Step A3 in FIG. 5)

FIG. 6 is a flowchart to describe the top-mark-row detection processing in detail (simplified detection processing at Step A3 in FIG. 5). First, the control section 11 analyzes the photographed image (input image) acquired from the document camera C, carries out the processing (template matching: pattern matching) of judging whether or not an image portion similar to a template (comparison reference image of the mark M, which is prepared in advance) is included in the photographed image, and thereby detects an individual mark M with respect to the top mark row M-1 in the photographed image (Step B1). Here, when the change (similarity) of the image is within an allowable range with respect to the template, the control section 11 detects (recognizes) it as the mark M.

Figure 9A:
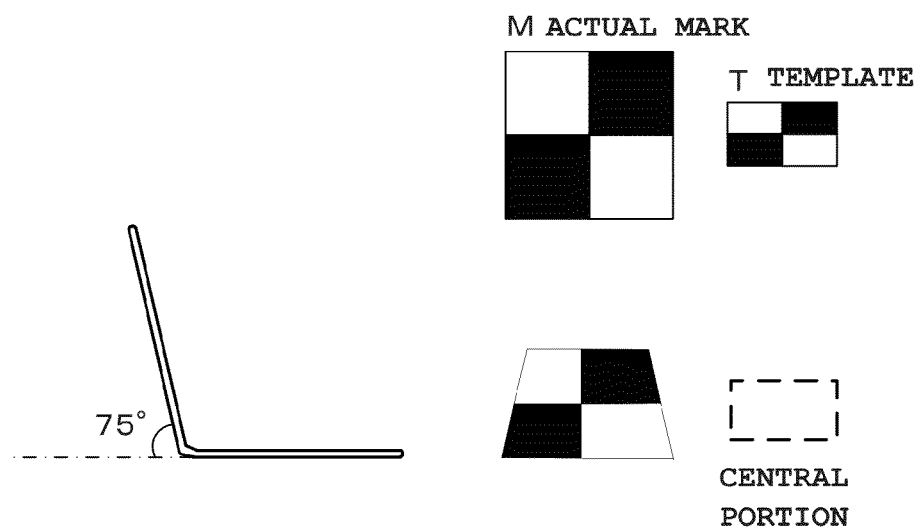
FIGS. 9A to 9C are diagrams to describe a template T used at Step B1 in FIG. 6 (template matching)
Figure 9B:
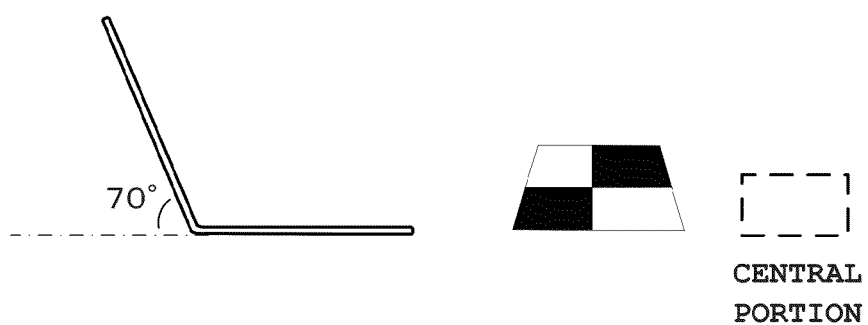
Figure 9C:
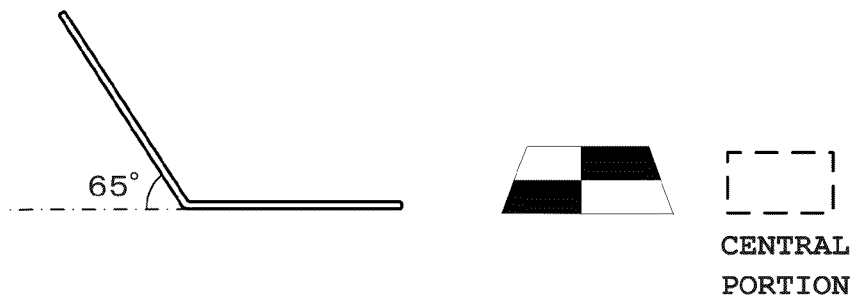

FIGS. 9A to 9C are diagrams to describe the characteristics of template matching of the embodiment of the present invention. The individual mark M is an indicator having a pattern in which a plurality of figures are alternately arranged in the form of matrix, that is, a checkered pattern in which the squares of two colors (black and white) are alternately arranged in the form of two-by-two matrix. The shape of the template T (comparison reference image) of the mark M is different from the entire shape of the actual mark M, and the template T is a partial image similar to the central portion of the actual mark M and is self-similar in pattern with respect to the whole of the actual mark M.

That is, the template T is a partial image corresponding to the central portion of the actual mark M. Here, the range of angles which are suitable for photographing the paper medium 3 is provided in a range from the angle of the maximum 75 degrees to the angle of the minimum 65 degrees, as the tilt angle of the first housing 2a. As illustrated in FIG. 9A, compared with the actual mark M shaped in a square, the shape of the mark M in the image photographed at the angle of the maximum 75 degrees is represented in a state where the left and right sides are tilted, and the upper side is short, and the lower side is long, and its entire shape is approximately formed in a trapezoid, and the up-and-down direction of the shape is in a collapsed (contracted) state. Also, as illustrated in FIGS. 9B and 9C, the shapes of the mark M in the image photographed at the angles of the optimal 70 degrees and the minimum 65 degrees are represented such that the form of the trapezoid are clarified, and a collapsed state in the up-and-down direction is increased, as the angle decreases. In this case, the entire shape of the template T is smaller than the shape of the actual mark M, and is formed in a rectangle whose shape in the longitudinal direction is collapsed whereas the entire shape of the actual mark M is formed in a square.

Thus, the shape of the mark M in the photographed image is substantially changed by geometrical distortion corresponding to the tilt angle of the first housing 2a. However, the pattern of the central portion of the mark M is kept at an approximated pattern even when the tilt angle of the first housing 2a is changed. Accordingly, the central portion of the image photographed at the angles of the maximum 75 degrees, the optimal 70 degrees, and the minimum 65 degrees, that is, a rectangle (lateral rectangle) in a dotted line illustrated in FIG. 9A to 9C is used as the template T of the embodiment of the present invention. The lateral rectangle of the central portion of the image is slightly smaller than the mark M in the image photographed at the angle of the minimum 65 degrees and formed in a checkered pattern in which the arranged in the form of two-by-two matrix. That is, the size of the template T is shorter in width in the lateral and longitudinal directions, compared with size of the mark M in the image photographed at the angle of the minimum 65 degrees.

It may be such that a lateral rectangle is cut out from the central portion of the image photographed at the angles of the maximum 75 degrees, the optimal 70 degrees, and the minimum 65 degrees, and a pattern in which the lateral rectangles are equalized (pattern including geometrical distortion) is applied as the template T of the embodiment of the present invention. In this case, as long as the angle comes within the range of the angles of the maximum 75 degrees to the minimum 65 degrees, the template is not separately used for each photographing angle, for example, for the angle of the optimal 70 degrees, or for the angle of the minimum 65 degrees, and the same template T is jointly used so as to perform template matching, regardless of the present tilt angle.

Although each mark M is detected through the template matching, the detection error (non-detection, excessive detection) is often included in the detection results. In this case, a correct point (mark M) is selected from the each detection point (mark candidate point). In this time, respective marks constituting the top mark row M-1 are arranged in a straight line at regular intervals, which makes it possible method. Accordingly, the straight line is detected from respective detection points (mark candidate point), and the points arranged at regular intervals on the straight line are detected, whereby the top mark row M-1 is detected (recognized).

That is, the control section 11 selects two points at random from each detection point (mark candidate point) based on the aforementioned template matching (Step B2), calculates the straight line passing through the two points (Step B3), and counts the number of detection points on the straight line (Step B4). Then, the control section 11 judges whether or not the processing has been carried out the designated number of times (the number of times determined in consideration of a balance between the processing speed and accuracy in the course of processing) (Step B5). Then, until the processing is carried out the designated number of times, the control section 11 returns to the aforementioned Step B2, and repeats the processing for acquiring the straight line passing through the two points, and counting the number of detection points on the straight line (Steps B2 to B4). When the processing is performed for the designated number of times (Step B5, YES), the control section 11 selects the straight line on which the maximum number of detection points is arranged, from among the straight lines selected at random (Step B6), acquires the count value (the number of detection points) (Step B7), and judges whether or not the number of detection points is equal to or higher than a predetermined threshold value, for example, whether or not the number of detection points is equal to or higher than two thirds of the number of marks of the top mark row M-1 (Step B8).

When the number of detection points is lower than the threshold value (Step B8, NO), the control section 11 judges that the top mark row M-1 is not detected, ends the processing with the result of non-detection, and exits the flow in FIG. 5. In contrast, when the number of detection points is equal to or higher than the threshold value (Step B8, YES), the control section 11 judges that there is a probability that the top mark row M-1 has been normally detected, and proceeds to Step B9. In this case, the first housing 2a (object) having the marks M arranged thereon is made up of, for example, a plate member such as thick paper bonded with a synthetic resin sheet. Accordingly, there is a case where part of the first housing 2a is slightly warped or twisted, and the first housing 2a (object) is not correctly positioned with respect to the document camera C.

In order to cope with the aforementioned state, the top mark row M-1 is detected in consideration of not only the number of detection points but also a state where each detection point is arranged. Here, the control section 11 carries out processing for selecting the detection points arranged at regular intervals, from the detection points detected as described above. In this case, it is not clear as to which position to refer to as a reference, as to which detection point to select based on the reference position, and as to what interval between the detection points is provided. Accordingly, prior to the processing for selecting the detection points, the control section 11 carries out processing for searching the intervals and the reference position corresponding to the top mark row M-1 (Steps B9 to B14).

That is, after an arbitrary value is set as an initial values for the intervals and the reference position (Step B9), the control section 11 puts points at regular intervals based on the reference position (Step B10), and counts the number of points at which the put points correspond to the detection points (Step B11). Then, the control section 11 judges whether or not the processing above has been carried out the designated number of times (for example, three times) (Step B12). When the processing above has not been carried out the designated number of times (Step B12, NO), the control section 11 changes the setting values of the intervals and the reference position (Step B13), and then returns to the aforementioned Step 10. Hereafter, the control section 11 puts points at regular intervals based on the reference position after the change and repeats the processing for counting the number of points at which the put points correspond to the detection points (Steps B10 to B13).

Figure 10:
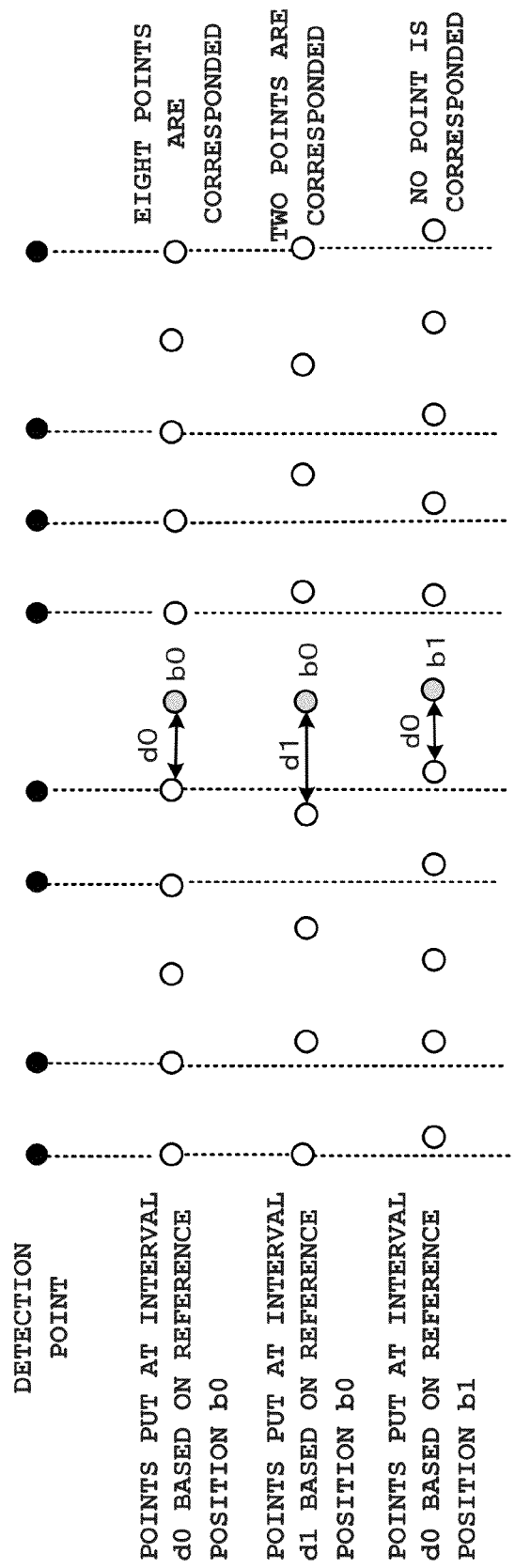
FIG. 10 is a diagram to describe Step B6 in FIG. 6.

FIG. 10 is a diagram illustrating a state where the control section 11 counts the number of points at which the put points correspond to the detection points while changing the setting values of the intervals and the reference position. In the diagram, "black circle" represents each detection point on the straight line, and "white circle" represents a point put at regular intervals based on the reference position on the straight line. In the example, the eight detection points (black circles) have been linearly arranged, and part of the row of the detection points has not been arranged at regular intervals, or in other words, a detection error (non-detection) has occurred. The diagram illustrates a state where the central position of the photographed image serves as a reference position b0 on the first line of the white circle rows (rows of the points to be put), and the white circle has been put at every interval d0 based on the reference position b0.

Note that, in the present embodiment, the position where the top mark row M-1 may exist is assumed to be the central portion of the photographed image, and therefore the central portion serves as the reference position b0. However, the reference position b0 is not limited thereto. For example, the central point of the row of the detection points, the right end or the left end of the row of the detection points may be applied. Also, the interval d0 is an interval between the marks M in a case where the tilt angle of the first housing 2a is at the predetermined angle (optimal angle of 70 degrees) in the state of the first housing 2a (object) which is suitable for photographing the paper medium 3. The diagram illustrates a state in which, on the second line of the white circle rows (rows of the points to be put), the reference position b0 is not changed with respect to the first line, the interval d0 is changed to an interval d1, and the white circle is put at every interval d1 based on the reference position b0. The diagram also illustrates a state in which, on the third line of the white circle rows (rows of the points to be put), the interval d0 is not changed with respect to the first line, the reference position b0 is changed to a reference position b1, and the white circle is put at every interval d0 based on the reference position b1.

Thus, when the control section 11 changes the combination of the reference position and the interval in the predetermined range and completes the processing the designated number of times (Step B12, YES), it selects the reference position and the interval with regards to the maximum number of points at which the put points correspond to the detection points (Step B14). In the example in FIG. 10, on the first row of points where points have been put at the intervals d0 based on the reference position b0, the eight put white circles correspond to the detected black circles. On the second row of points where points have been put at the intervals d1 based on the reference position b0, the two put white circles correspond to the detected black circles. On the third row of points where points have been put at the intervals d0 based on the reference position b1, no white circle corresponds to the detected black circle. Accordingly, the control section 11 selects the reference position b0 and the interval d0 with regards to the maximum number of points at which the put points correspond to the detection points.

Then, the control section 11 acquires the number of detection points corresponding to the selected reference position b0 and interval d0 (Step B15) and judges whether or not the number of detection points is equal or higher than a predetermined threshold value, for example, whether or not the number of detection points is equal to or higher than two thirds of the number of marks of the top mark row M–1 (Step B16). When the number of detection points is equal or higher than the predetermined threshold value (Step B16, YES), the control section 11 judges that the top mark row M–1 has been normally detected, and therefore successfully completes the detection and exits the flow in FIG. 6. When the number of detection points is lower than the predetermined threshold value (Step B16, NO) the control section 11 judges that the top mark row M–1 is not detected, completes the processing with the result of non-detection, and exits the flow in FIG. 6. In the aforementioned detection processing, the processing for detecting the straight line from Step B2 to Step B6 and the processing for detecting the reference position and the interval from Step B9 to Step B14 are separately carried out, so that the number of parameters to be changed at once can be limited, whereby the efficiency of the processing in terms of the algorithm of RANSAC is improved. However, the detection processing may be carried out in a manner to simultaneously change the three parameters of the straight line, the interval and the reference position. According to the aforementioned processing, the marks M only corresponding to the top mark row M–1 can be selected from the plurality of marks M which include the detection error (non-detection, excessive detection) when detected.

Figure 11:
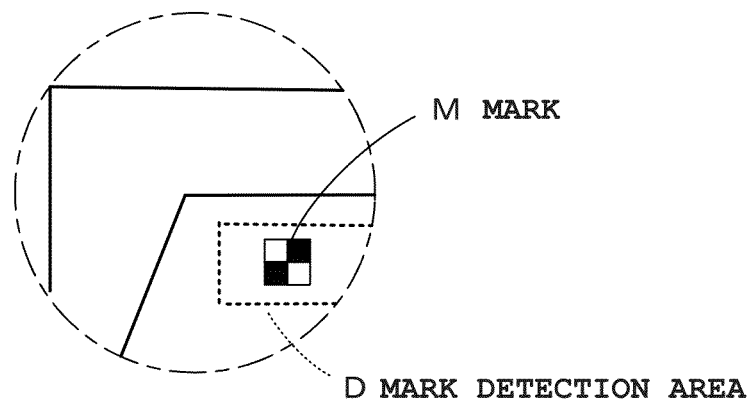
FIG. 11 is a diagram to describe Step A4 in FIG. 5.
Figure 11:
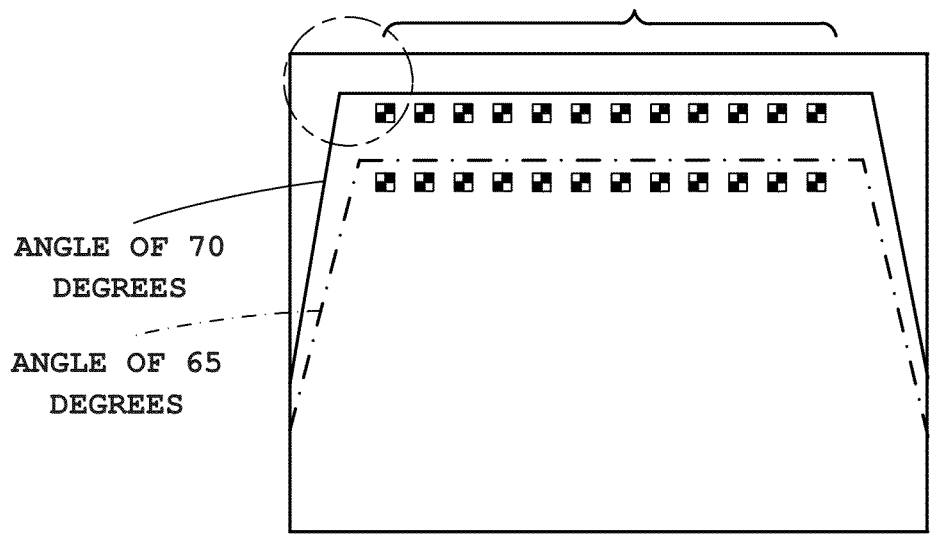

Thus, when the processing for detecting the top mark row M–1 (simplified detection: Step A3 in FIG. 5) is ended, the control section 11 determines whether or not the current state is equal to the predetermined state (state where the tilt angle of the first housing 2a is within the range of the predetermined angles of 65 to 75 degrees), based on whether or not the top mark row M–1 is positioned in a predetermined detection area in the photographed image (Step A4). FIG. 11 is a diagram to describe a state where the photogenic state of the top mark row M–1 in the photographed image changes in accordance with the tilt angle of the first housing 2a, which includes a partial enlarged view of the photographed image.

The position of the top mark row M–1 in the photographed image changes as the tilt angle of the first housing 2a increases. In the diagram, the position of the top mark row M–1 is upwardly transferred in the photographed image. The control section 11 recognizes the change of the position of the top mark row M–1, and judges whether or not the current state is equal to a predetermined state (state where the tilt angle of the first housing 2a is within the range of the angles of 65 to 75 degrees) based on the position after the change. In this case, a mark detection area D is provided at a position fixedly designated in the photographed image, and the control section 11 judges whether or not the current state is equal to the predetermined state (within the range of the predetermined angles) based on whether or not the top mark row M–1 is within the mark detection area D.

When the top mark row M–1 is not within the mark detection area P that is, when the tilt angle of the first housing 2a is not within the range of the angles of 65 to 75 degrees (Step A4, NO), the control section 11 returns to the aforementioned Step A1. In contrast, when the top mark row M–1 is within the mark detection area D, that is, when the tilt angle of the first housing 2a is within the range of the angles of 65 to 75 degrees (Step A4, YES), the control section 11 judges whether or not the first housing 2a has stopped (Step A5). In this case, the control section 11 judges whether or not the first housing 2a has stopped, based on the state of the top mark row M–1 with respect to the mark detection area D, and maintains a standby state until the first housing 2a stops. When the stop of the first housing 2a is detected (Step A5, YES), the control section 11 instructs the document camera C to photograph an image, and in response to the instruction, the document camera C photographs the image, which is acquired by the control section 11 (Step A6). In this case, the focus position of the document camera C has been set to a point on the far end side which is slightly away from the central portion of the flat surface of the opened first housing 2a. Hereafter, the control section 11 proceeds to processing for detecting the top mark row, the left mark row and the right mark row (detection processing for projective transformation) (Step A7).

Figure 7:
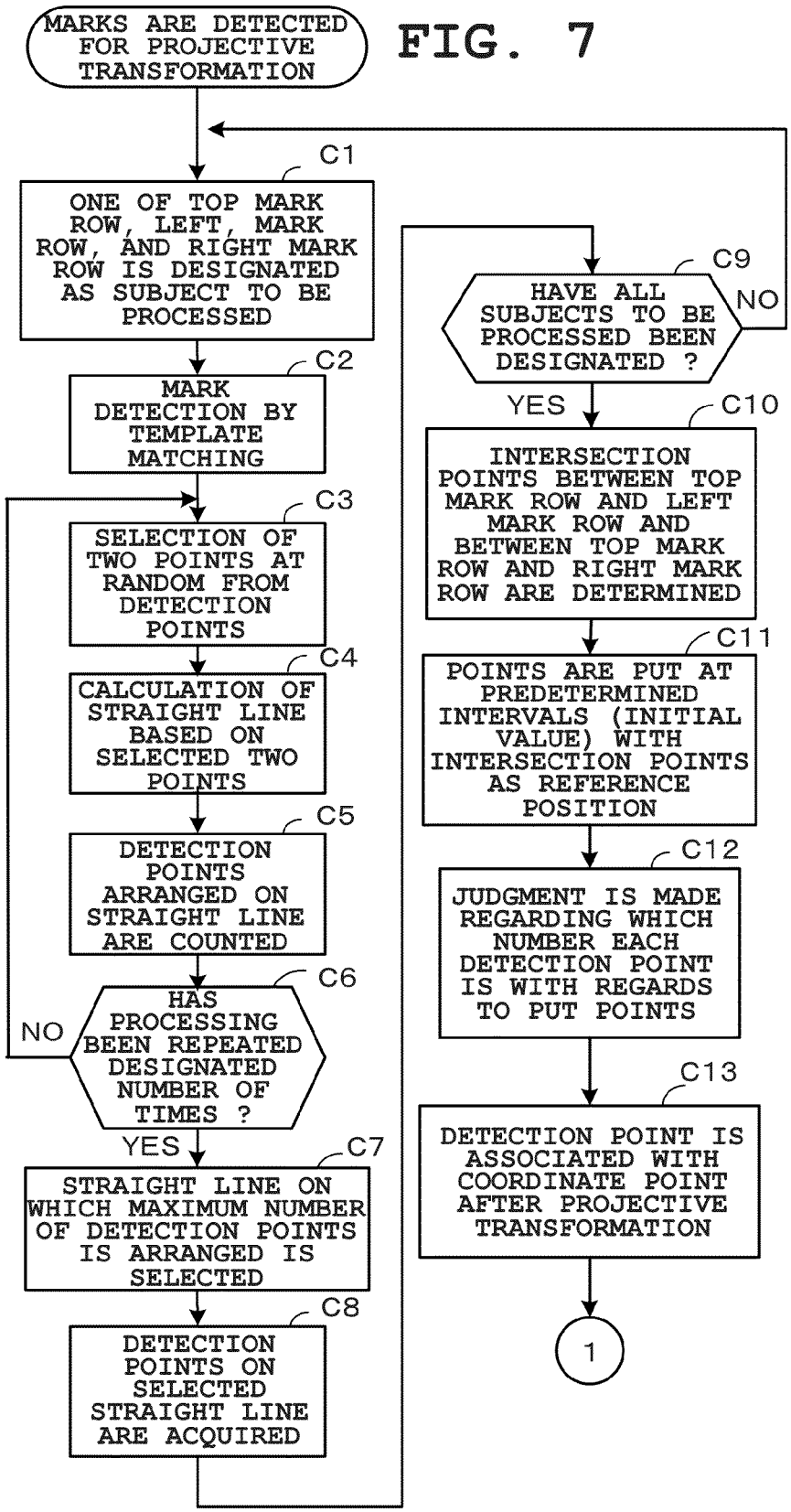
FIG. 7 is a flowchart to describe processing for detecting a top mark row, a left mark row, and a right mark row in detail (detection processing for projective transformation: Step A7 in FIG. 5)
Figure 8:
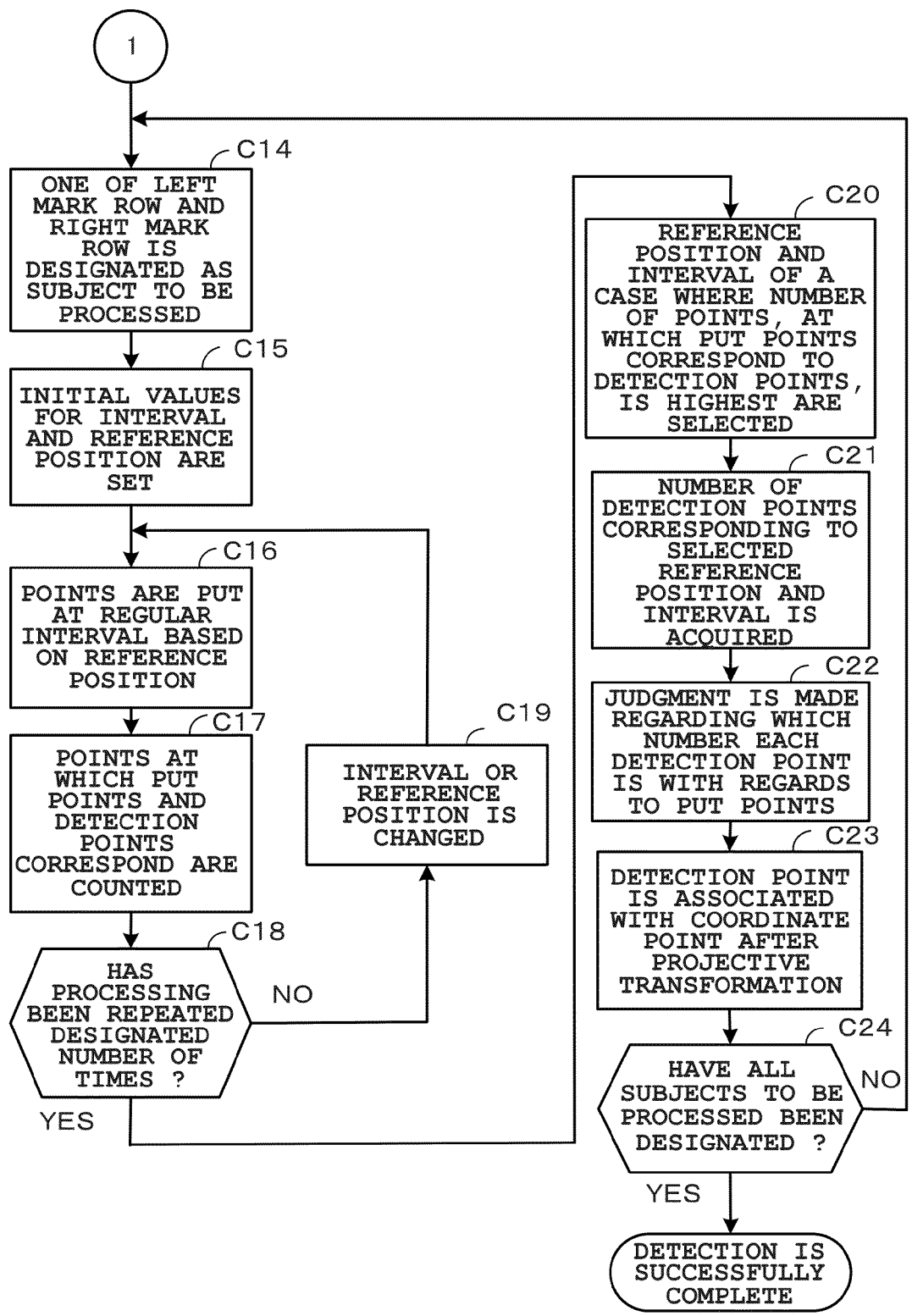
FIG. 8 is a flowchart following the operation in FIG. 7.

FIG. 7 is a flowchart to describe the processing for detecting the top mark row, the left mark row, and the right mark row in detail (the detection processing for projective transformation: Step A7 in FIG. 5). In the aforementioned processing for detecting the top mark row (Step A3), the top mark row M–1 is detected in order to judge the timing at which the tilt angle of the first housing 2a comes within the range of the predetermined angles. The processing for detecting the top mark row, the left mark row, and the right mark row (Step A7) is the processing (detection processing for projective transformation) in which the top mark row M–1, the left mark row M–2 and the right mark row M–3 are detected in order to judge the distortion status of the photographed image for the projective transformation processing (trapezoid distortion correction processing).

First, the control section 11 designates one of the top mark row M–1, the left mark row M–2, and the right mark row M–3 as a subject to be processed (Step C). At first, the control section 11 designates the top mark row M–1 as a subject to be processed. Then, after detecting each mark M constituting the top mark row M–1 based on the template matching (Step C2), the control section 11 selects two points at random from each detection point (mark candidate point) (Step C3), calculates the straight line passing through the two points (Step C4), and counts the number of detection points arranged on the straight line (Step C5). Then, when the processing above is performed for the designated number of times (Step C6, YES); the control section 11 selects the straight line on which the greatest number of detection points have been arranged (Step C7), and acquires the count value (the number of detection points) (Step C8).

Thus, when the processing for one subject to be processed is ended, the control section 11 judges whether or not all the subjects to be processed have been designated (Step C9). At present, the top mark row M−1 has been designated at first, and therefore the control section 11 returns to the aforementioned Step C1. Then, after the left mark row M−2 is designated as the next subject to be processed, the control section 11 carries out the aforementioned processing for the left mark row M−2 (Steps C2 to C8). Subsequently, when the processing for the left mark row M−2 is ended, the control section 11 designates the right mark row M−3 as a subject to be processed (Step C1), and carries out the aforementioned processing for the right mark row M−3 (Steps C2 to C8).

Figure 12:
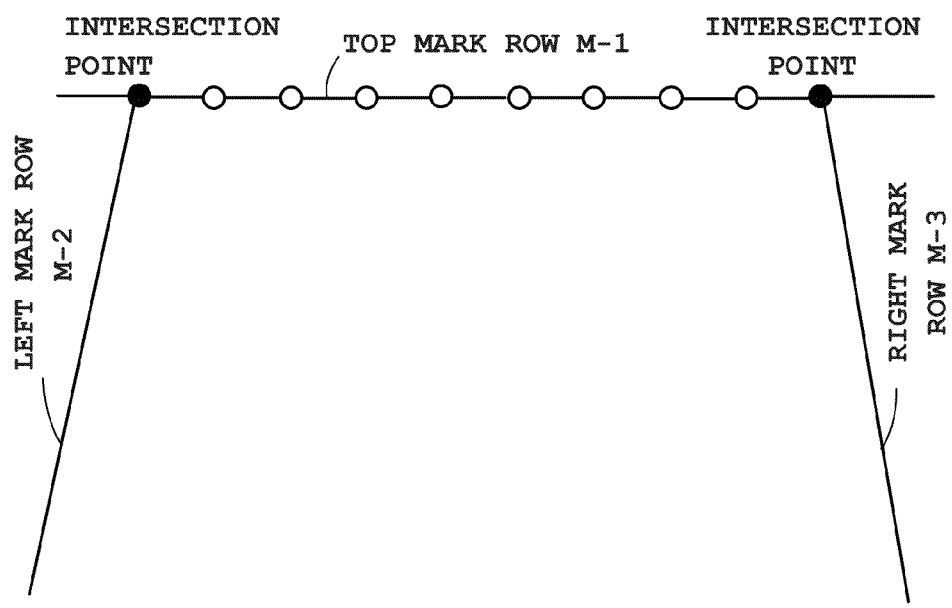
FIG. 12 is a diagram to describe Steps C10 and C11 in FIG. 7.

Accordingly, when the top mark row M−1, the left mark row M−2, and the right mark row M−3 in the photographed image are detected, that is, when the designation of all the subjects to be processed is completed (Step C9, YES), the control section 11 acquires a point of intersection between the straight line of the top mark row M−L and the straight line of the left mark row M−2, and a point of intersection between the straight line of the top mark row M−1 and the straight line of the right mark row M−3 (Step C10). Then, the two points of intersection are connected with a straight line, one of the two points of intersection serves as a reference position, and the control section 11 puts points for every predetermined interval (initial value) based on the reference position (point of intersection) on the straight line (Step C11). FIG. 12 is a diagram illustrating the point of intersection (black circle) between the straight line of the top mark row M−1 and the straight line of the left mark row M−2 the point of intersection (black circle) between the straight line of the top mark row M−1 and the straight line of the right mark row M−3, and points (white circle) each of which has been put at a predetermined interval apart (initial value) based on one of the points of intersection (black circles). FIG. 12 illustrates a case where eight points have been put between the two points of intersection (black circles).

Then, the control section 11 judges which number each detection point is with regards to the put points, and excludes all the detection errors (non-detection, excessive detection) from each detection point (Step C12). That is, the control section 11 specifies, from among the detection points, each of detection points having a positional relationship similar to the line of the plurality of marks M, and excludes all other detection points. Accordingly, the control section 11 associates each specified detection point with the coordinate point after projective transformation (trapezoid distortion correction), and thereby acquires parameters (geometrical transformation parameters) for the projective transformation processing (trapezoid distortion correction) (Step C13).

As described above, in the determination of the plurality of marks M corresponding to the top mark row M−1, the intersection points between the straight line of the top mark row M−1 and the straight line of the left mark row M−2, and between the straight line of the top mark row M−1 and the straight line of the right mark row M−3 can uniquely be determined as the reference position, and the number of marks M which are interposed between the two reference positions is provided in advance, so that the interval between the marks M can uniquely be determined, which eliminates processing for searching the interval and the reference position. Note that, in the determination of the plurality of marks M corresponding to the top mark row M−1, processing for searching the interval and the reference position may be carried out without the use of the positional information on the intersection points. When the processing for the top mark row M−1 is completed, the control section 11 proceeds to the flow in FIG. 8, and carries out the processing for the left mark row M−2 and the right mark row M−3 (the detection processing for projective transformation).

First, the control section 11 designates one of the left mark row M−2 and the right mark row M−3 as a subject to be processed (Step C14) When the left mark row M−2 is designated the control section 11 carries out the processing for searching the interval and the reference position corresponding to the left mark row M−2 (Steps C15 to C20). The search processing is basically similar to that of the aforementioned Steps B9 to B14 in FIG. 5. After setting the initial values of the interval and the reference position (Step C15), the control section 11 puts points at regular intervals based on the reference position (Step C16) and counts the number of points at which the put points correspond to the detection points (Step C17). Then, the control section 11 repeats the aforementioned processing for the designated number of times (Steps C16 to C19) while changing the setting values of the interval and the reference position (Step C19). In this case, it may be such that the intersection point on the side designated as a subject to be processed is set as the reference position, and only the interval is changed.

Next, the control section 11 selects the reference position and the interval with regards to the maximum number of points at which the put points correspond to the detection points (Step C20), and acquires the number of detection points corresponding to the selected reference position and interval (Step C21). Subsequently, the control section 11 judges which number each detection point is with regards to the put points, and excludes all the detection errors (non-detection, excessive detection) from each detection point (Step C22). Then, the control section 11 associates each detection point with the coordinate point after projective transformation (trapezoid distortion correction), based on as to which number each detection point is, and thereby acquires geometrical transformation parameters for the projective transformation processing (trapezoid distortion correction) (Step C23). When the processing for the left mark row M−2 is completed, the control section 11 judges whether or not all the subjects to be processed have been designated (Step C24). At present, the processing for the right mark row M−3 has not been carried out (Step C24, NO), and therefore the control section 11 returns to the aforementioned Step C14. Then, after designating the right mark row M−3 as a subject to be processed, the control section 11 repeats the aforementioned Steps C15 to C23 and ends the flow in FIG. 8.

When the control section 11 completes the processing for detecting the top mark row, the left mark row, and the right mark row (detection processing for projective transformation: Step A7 in FIG. 5), the control section 11 carries out the projective transformation processing (trapezoid distortion correction) based on the aforementioned parameters for the projective transformation processing (trapezoid distortion correction) (Step A8 in FIG. 5), carries out compression processing for the photographed image after the projective transformation (after correction), and proceeds to processing for storing the compressed photographed image in an SD card and the like (Step A9). Then, the control section 11 judges whether or not the top mark row M−1 has come out of the mark detection area D due to the change of the tilt angle according to the movement of the first housing 2a (Step A10). When the top mark row M−1 is still within the mark detection area D (Step A10, NO), the control section 11 maintains a standby state until the top mark row M-1 comes out of the mark detection area P. Here, when the top mark row M-1 comes out of the mark detection area P (Step A10, YES), the control section 11 returns to the aforementioned Step A1, where the control section 11 judges whether or not the document mode has been canceled. When the document mode ends in response to the cancellation of the mode (Step A1, YES), the control section 11 exits the flow in FIG. 5.

As described above, when an object (first housing 2a) on which a plurality of indicators (marks N) have been arranged is photographed by the document camera C, the image processing apparatus (tablet terminal apparatus 1) according to the embodiment of the present invention recognizes the marks M in the photographed image, detects the positions of the marks M, and judges the state of the object based on the positions of the marks M. When the object enters a predetermined state, the image processing apparatus judges the state of the photographed image based on the positional relation of the detected marks M. Accordingly, the judgment of the state of the object and the judgment of the state of the photographed image can be made with high accuracy by merely detecting the plurality of marks M arranged on the object, and the image processing corresponding to the state of the image can be accurately carried out.

When judging the state of the object based on the marks M in the photographed image, the image processing apparatus judges a state where an angle between the object and the document camera C is within a predetermined range, as the state of the object, and judges the status of geometrical distortion of the photographed image in which the whole or part of the photographed image is distorted, as the state of the photographed image. Accordingly, for example, the image processing apparatus can judge photographing timing with high accuracy by merely detecting the marks M in the photographed image without an angle sensor, and can judge the distortion status of the photographed image photographed when the angle between the object and the document camera C is within the predetermined range, with high accuracy, whereby the image processing (projective transformation processing) corresponding to the state of the photographed image can be accurately carried out.

Also, the image processing apparatus recognizes the plurality of marks M in the photographed image by using the template T (comparison reference image) for pattern matching which is prepared in advance, and thereby judges the state of the object, based on each of detection points having a positional relationship similar to the line (mark row) of the plurality of marks M, among the detection points whose positions have been individually detected. Therefore, for example, even when a detection error (non-detection, excessive detection) occurs at the time of the pattern matching, or even when part of the mark row is not photographed due to a reflected ray or the viewing angle, or even when the photographing status deteriorates, the image processing apparatus can recognize the entire mark row in the photographed image normally, whereby the state of the object can be judged with high accuracy.

Moreover, the image processing apparatus recognizes the plurality of marks M in the photographed image by using the template T (comparison reference image) for pattern matching which is prepared in advance, and thereby judges the state of the photographed image based on each of detection points having a positional relationship similar to the line (mark row) of the plurality of marks M, among the detection points whose positions have been individually detected. Accordingly, even when part of the mark row is not photographed due to a reflected ray or the viewing angle, or even when the photographing status deteriorates, the image processing apparatus can recognize the entire mark row normally, whereby the state of the photographed image can be judged with high accuracy.

Furthermore, the image processing apparatus carries out the processing of the photographed image based on the state of the judged photographed image. Therefore, the image processing apparatus can accurately carry out the image processing corresponding to the judgment results with high accuracy (the state of the image).

The individual mark M is an indicator having a pattern whose shape or contrast is clear by the figures (rectangles) of two colors (black and white) being alternately arranged, so that detection errors can be decreased, by which further improvement can be expected in terms of the accuracy in the judgment. Also, the pattern shape (pattern) of the individual mark M is self-similar in a manner that the pattern shape of the detail portion in the center of the individual mark M is equal to the whole pattern shape of the individual mark M, so that the pattern matching can be performed without being substantially affected by the influence on the change of the photographing distance. Moreover, the direction of the line of demarcation between the patterns having the two colors (black and white), which forms the pattern of the mark M, is provided corresponding to the direction that the first housing 2a and the second housing 2b are opened, so that the pattern matching can be performed without being substantially affected by the influence on the change in the photographing direction which is caused by the opening operation of the first housing 2a and the second housing 2b.

Also, as described above, the pattern matching can be performed without being substantially affected by the influence on the change of the photographing distance or the change in the photographing direction, so that it is not necessary to prepare a plurality of templates to detect the individual mark M corresponding to the different photographing distance or the different photographing direction, and it is not necessary to perform the pattern matching a plurality of times while changing the magnitude or shape of one template, whereby the efficiency of the pattern matching processing is improved.

Also, the image processing apparatus uses, as the first indicator, the top mark row M-1 arranged at a predetermined position out of the plurality of marks M (the top mark row M-1, the left mark row M-2, and the right mark row M-3) on the first housing 2a (object), and judges the state of the object based on the position of the first indicator. In addition, the image processing apparatus uses, as the second indicator, the left mark row M-2 and the right mark row M-3 arranged at positions other than the position of the first indicator, and judges the state of the photographed image based on the positional relation of the top mark row M-1, and the left mark row M-2 and the right mark row M-3 which are the second indicator, so that the image processing apparatus can judge the state of the object by the relatively simple detection based on only the top mark row M-1 and can judge the state of the photographed image by the relatively complex detection based on the top mark row M-1, the left mark row M-2, and the right mark row M-3. That is, judgment using the marks M properly at two stages can be made. In a situation where it is necessary to repeatedly execute the detection processing a plurality of times, such as a case where the change of the state of the object is detected it is merely required to increase the detection speed with the simple detection and execute the detection processing one time because the state of the object has been determined. In contrast, in a situation where detection with high accuracy is required, it is possible to optimize the speed and accuracy of the detection corresponding to the situation in a manner to enhance the detection accuracy with the complicated detection.

The top mark row M-1 (first indicator) is arranged at the end portion on the opposite side of the hinge section 2c (connection section) on the flat surface of the opened first housing 2a, and the left mark row M-2 and the right mark row M-3 (second indicator) are respectively arranged on end portions on both sides on the flat surface of the opened first housing 2a, so that the positions of the first and second indicators are suitably arranged to judge the state of the object or the state of the photographed image, and the top mark row M-1 (first indicator), the left mark row M-2 and the right mark row M-3 (second indicator) can readily be distinguished corresponding to the arranged positions of the first and second indicators.

The image processing apparatus includes the first housing 2a on which the plurality of marks M are arranged, the second housing 2b including the document camera C to photograph an object (paper medium 3) mounted on the first housing 2a, and the connection section (hinge section 2c) which openably and closably connects the first housing 2a with the second housing 2b so that they can be in an unfolded state. For example, in the state where the second housing 2b has been horizontally placed, when the tilt angle of the first housing 2a comes within the range of the predetermined angles, the image processing apparatus can determine that it is photographing timing at which the paper medium 3 on the first housing 2a is photographed, and correctly judge the opening and closing of the first housing 2a and the second housing 2b by merely detecting the marks M, without using an open-and-close sensor for detecting it.

When the detected mark M comes within the predetermined position in the photographed image (mark detection area D), the image processing apparatus judges that the angle of the first housing 2a with respect to the second housing 2b has come within the range of predetermined angles (65 to 75 degrees) and judges this state as the state of the object. Accordingly, the user can photograph the object in an optimal state by merely changing the angle of the first housing 2a.

In a state where the plurality of marks H have been arranged in an array at which the top mark row M-1, the left mark row M-2, and the right mark row M-3 are recognizable as a rectangle, the image processing apparatus judges the distortion status of the photographed image based on the distortion of the rectangular frame recognized based on the line of the plurality of marks M in the state where the angle of the first housing 2a with respect to the second housing 2b is within the range of the predetermined angles. Accordingly, the image processing apparatus can judge the distortion status of the photographed image with high accuracy, and thereby can accurately carry out the image processing (projective transformation processing) corresponding to the state of the photographed image.

In a state where the second housing 2b, which includes the document camera C to photograph an object on the flat surface of the opened first housing 2a, is open, the focus position of the document camera C has been set on a point on the far end side from the central portion of the flat surface of the opened first housing 2a, which makes it easy for the document camera C to take in the whole of the object. That is, characters on the near end side are projected larger than characters on the far end side, so that the characters on the near end side are relatively easily recognized even when these characters to be photographed are slightly blurred. However, when the characters on the far end side become blurred, it is hard to recognize them. Accordingly, by setting the focus position on the far end side, the characters on the near end side and the far end side can be properly recognized.

In the aforementioned embodiment of the present invention, the paper medium 3 is mounted on the first housing 2a. However, the paper medium 3 may integrally be mounted on the first housing 2a. In this case, the first housing 2a may be removable (detachable) from the second housing 2b.

Also, in the aforementioned embodiment of the present invention, the marks N are printed on the end portions of the first housing 2a. However, the marks M may be pasted on the first housing 2a. Also, the marks H may be printed on the end portions of the paper medium 3.

Moreover, in the aforementioned embodiment of the present invention, each mark M is formed in a checkered pattern in which the squares of two colors (black and white) are alternately arranged in the form of two-by-two matrix. However, the color and pattern of the mark H are arbitrary. In addition, in the top mark row M-1, the left mark row M-2, and the right mark row M-3, the plurality of marks M are linearly arranged at regular intervals. However, as long as the plurality of marks M are arranged with a predetermined regularity, the interval and arrangement regarding the marks M are arbitrary.

Furthermore, in the aforementioned embodiment of the present invention, the pattern shape of the mark M arranged on the side of the housing is formed in a square, and the template T (comparison reference image) for pattern matching is deformed as a rectangle in consideration of the case where the marks M are obliquely photographed. However, conversely, the template T (comparison reference image) for pattern matching may be formed in a square, and the pattern shape of the mark M arranged on the side of the housing may be a pattern shape distorted in advance so that it is formed into a square when the marks M are obliquely photographed at a predetermined angle. In this case, the magnitude of the plurality of marks H arranged on the side of the housing may be adjusted in advance and arranged such that the magnitude of all the marks M becomes equal, when the marks M are photographed at a predetermined angle and at a predetermined distance (the adjustment is made at the time of photographing the marks so that the magnitude of the mark M is increased in proportion to the distance from the camera section).

Still further, in the aforementioned embodiment of the present invention, the direction of the checkered pattern of the mark M is common to all the marks M to be arranged. However, the direction of the checkered pattern of the mark M may be changed in a predetermined portion. For example, a configuration may be adopted in which, in the central portion of the plurality of marks M arranged on the upper portion, the marks M are arranged such that the left and right of the checkered pattern are inverted. This makes it possible to recognize the position, where the direction of the checkered pattern of the mark M is inverted, as the central portion of the line of the plurality of marks M.

Yet still further, in the aforementioned embodiment of the present invention, the image processing apparatus judges whether or not the angle between the object and the document camera C is within the range of the predetermined angles, that is, whether or not the angle of the first housing 2a with respect to the second housing 2b has come within the range of the predetermined angles. However, image processing apparatus may judge whether or not the distance between the document camera C and the object is within a predetermined range. As a result, for example, geometrical distortion, which is exemplified by the transformation of a circle into an ellipse or of a square into a trapezoid, can be corrected with high accuracy, corresponding to the distance between the document camera C and the object (perspective).

Yet still further, in the image processing apparatus of the aforementioned embodiment of the present invention, specific electronic components are not embedded in the first housing and the second housing, and the image processing apparatus provides only the function of housing the tablet terminal apparatus and the paper medium and the function of keeping the tablet terminal apparatus and the paper medium in a predetermined state. However, the function of the tablet terminal apparatus may be embedded in the second housing, or the function of the keyboard may be embedded in the first housing. Yet still further, the entire housing of the image processing apparatus of the aforementioned embodiment of the present invention is a binder type which is openable and closable. However, the present invention is not limited thereto. For example, a slide type may be applied. Yet still further, in the aforementioned embodiment of the present invention, the projective transformation (trapezoid distortion correction) is carried out as the image processing. However, it is not limited to the trapezoid distortion correction.

Yet still further, in the aforementioned embodiment of the present invention, when the angle of the first housing 2a with respect to the second housing 2b comes within the range of the predetermined angles, the document camera C photographs the first housing 2a (object). However, a configuration may be adopted in which a document camera C which can perform consecutive photographing (high speed photographing) is provided, the document camera C performs consecutive photographing with a frame rate of 15 frames per second (15 fps) when the angle of the first housing 2a with respect to the second housing 2b comes within the range of the predetermined angles, and an optimal image is selected from the images consecutively photographed. In this case, the selection of the optimal image may be based on the user's operation or automatic selection by means of image analysis.

Yet still further, in the image processing apparatus, the first housing 2a is obliquely raised and photographed with the second housing 2b being placed on the surface of a desk and the like. However, conversely, the second housing 2b may be obliquely raised and photographed with the first housing 2a being placed on the surface of a desk and the like. In addition, the tablet terminal apparatus 1 and the binder 2 may integrally be provided in the image processing apparatus. Yet still further, in the aforementioned embodiment, the tablet terminal apparatus 1 is an image processing apparatus. However, the present invention is not limited thereto, and can be applied to personal computers with a camera function, PDA (personal, portable information communication equipment), music players and the like.

Furthermore, the "apparatuses" and "sections" in the aforementioned embodiment of the present invention are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image processing apparatus comprising:
   an acquisition section which acquires a photographed image of an object on which a plurality of indicators have been arranged;
   a detection section which recognizes an indicator in the photographed image acquired by the acquisition section and detects a position of the indicator;
   a first judgment section which judges a state of the object based on the position of the indicator detected by the detection section; and
   a second judgment section which, when the state of the object judged by the first judgment section is a predetermined state, judges a state of the photographed image based on a positional relationship of the plurality of indicators detected by the detection section,
   wherein the first judgment section judges a timing at which the state of the object is changed to the predetermined state, based on a change of the position of the indicator sequentially detected by the detection section with respect to respective photographed images sequentially acquired by the acquisition section, and
   wherein the second judgment section judges the state of the photographed image based on positions of the indicators detected by the detection section with respect to a photographed image acquired by the acquisition section at the timing judged by the first judgment section.

2. The image processing apparatus according to claim 1, wherein the first judgment section judges a state where a photographing distance or a photographing angle with respect to the object is within a predetermined range, as the state of the object, and
   wherein the second judgment section judges a status of geometrical distortion of the photographed image which is partly or wholly distorted, as the state of the photographed image.

3. The image processing apparatus according to claim 1, further comprising a processing control section which instructs to perform processing of the photographed image based on the state of the photographed image judged by the second judgment section.

4. The image processing apparatus according to claim 1, wherein the plurality of indicators each have a pattern in which a plurality of figures are alternately arranged in a form of a matrix.

5. The image processing apparatus according to claim 1, further comprising:
   a first housing on which the plurality of indicators have been arranged;
   a second housing which includes a photograph section which photographs the object mounted on the first housing; and
   a connection section which connects the first housing with the second housing such that the first housing and the second housing are openable to be in an unfolded state.

6. The image processing apparatus according to claim 5, wherein a focus position of the photograph section is set on a point on a far end side from a central portion of a flat surface of the opened first housing, in a state where the first housing on which the plurality of indicators have been arranged and the second housing including the photograph section which photographs the object on the flat surface of the opened first housing have been opened to be in an unfolded state.

7. An image processing apparatus comprising:
   an acquisition section which acquires a photographed image of an object on which a plurality of indicators have been arranged;
   a detection section which recognizes an indicator in the photographed image acquired by the acquisition section and detects a position of the indicator;

a first judgment section which judges a state of the object based on the position of the indicator detected by the detection section; and a second judgment section which, when the state of the object judged by the first judgment section is a predetermined state, judges a state of the photographed image based on a positional relationship of the plurality of indicators detected by the detection section, wherein the detection section detects, when the photographed image of the object on which the plurality of indicators have been arranged with a predetermined regularity is acquired by the acquisition section, individual positions of the plurality of indicators by recognizing the plurality of indicators in the photographed image with use of a comparison reference image for pattern matching which is prepared in advance, and wherein the first judgment section judges the state of the object based on each of detection points having a positional relationship similar to a line having the predetermined regularity, among detection points detected by the detection section.

8. An image processing apparatus comprising:

an acquisition section which acquires a photographed image of an object on which a plurality of indicators have been arranged;

a detection section which recognizes an indicator in the photographed image acquired by the acquisition section and detects a position of the indicator;

a first judgment section which judges a state of the object based on the position of the indicator detected by the detection section; and a second judgment section which, when the state of the object judged by the first judgment section is a predetermined state, judges a state of the photographed image based on a positional relationship of the plurality of indicators detected by the detection section, wherein the detection section detects individual positions of the plurality of indicators by recognizing the plurality of indicators in the photographed image acquired by the acquisition section with use of a comparison reference image for pattern matching which is prepared in advance, and wherein the second judgment section judges the state of the photographed image based on each of detection points having a positional relationship similar to a line having a predetermined regularity, among detection points detected by the detection section.

9. An image processing apparatus comprising:

an acquisition section which acquires a photographed image of an object on which a plurality of indicators have been arranged;

a detection section which recognizes an indicator in the photographed image acquired by the acquisition section and detects a position of the indicator;

a first judgment section which judges a state of the object based on the position of the indicator detected by the detection section; and a second judgment section which, when the state of the object judged by the first judgment section is a predetermined state, judges a state of the photographed image based on a positional relationship of the plurality of indicators detected by the detection section, wherein the first judgment section regards, among the plurality of indicators arranged on the object, an indicator arranged at a predetermined position as a first indicator, and judges the state of the object based on a position of the first indicator, and wherein the second judgment section regards, among the plurality of indicators arranged on the object, an indicator arranged at another position other than the predetermined position of the first indicator as a second indicator and, when the plurality of indicators including the second indicator are detected by the detection section, judges the state of the photographed image based on the positional relationship of the plurality of indicators.

10. The image processing apparatus according to claim 9, further comprising:

a first housing on which the plurality of indicators have been arranged;

a second housing which includes a photograph section which photographs the object mounted on the first housing; and a connection section which connects the first housing with the second housing such that the first housing and the second housing are openable to be in an unfolded state, wherein the first indicator is arranged at an end portion on a flat surface of the opened first housing on an opposite side of the connection section, and wherein the second indicator is arranged at end portions on both sides on the flat surface of the opened first housing.

11. An image processing apparatus comprising:

an acquisition section which acquires a photographed image of an object on which a plurality of indicators have been arranged;

a detection section which recognizes an indicator in the photographed image acquired by the acquisition section and detects a position of the indicator;

a first judgment section which judges a state of the object based on the position of the indicator detected by the detection section;

a second judgment section which, when the state of the object judged by the first judgment section is a predetermined state, judges a state of the photographed image based on a positional relationship of the plurality of indicators detected by the detection section;

a first housing on which the plurality of indicators have been arranged;

a second housing which includes a photograph section which photographs the object mounted on the first housing; and a connection section which connects the first housing with the second housing such that the first housing and the second housing are openable to be in an unfolded state, wherein the first judgment section judges that an angle of the first housing with respect to the second housing has come within range of predetermined angles, when the indicator detected by the detection section comes within a predetermined area in the photographed image, and judges a state where the angle is within the range of predetermined angles, as the state of the object.

12. The image processing apparatus according to claim 11, wherein, in a state where the plurality of indicators have been arranged in an array which is recognizable as a rectangle, the second judgment section judges a distortion status of the photographed image based on distortion of a rectangular frame recognized based on the array of the plurality of indicators detected by the detection section, when the first judgment section judges that the angle of the first housing with respect to the second housing has come within the range of predetermined angles.

13. An image processing method comprising:

an acquisition step of acquiring a photographed image of an object on which a plurality of indicators have been arranged;

a detection step of recognizing an indicator in the acquired photographed image and detecting a position of the indicator;

a first judgment step of judging a state of the object based on the detected position of the indicator; and a second judgment step of judging a state of the photographed image based on a detected positional relationship of the plurality of indicators, when the judged state of the object is a predetermined state, wherein the first judgment step judges a timing at which the state of the object is changed to the predetermined state, based on a change of the position of the indicator sequentially detected by the detection step with respect to respective photographed images sequentially acquired by the acquisition step, and wherein the second judgment step judges the state of the photographed image based on positions of the indicators detected by the detection step with respect to a photographed image acquired by the acquisition step at the timing judged by the first judgment step.

14. A non-transitory computer-readable storage medium having stored thereon a program that is executable by a computer, the program being executable by the computer to perform functions comprising:

acquisition processing for acquiring a photographed image of an object on which a plurality of indicators have been arranged;

detection processing for recognizing an indicator in the acquired photographed image and detecting a position of the indicator;

first judgment processing for judging a state of the object based on the detected position of the indicator; and second judgment processing for judging a state of the photographed image based on a detected positional relationship of the plurality of indicators, when the judged state of the object is a predetermined state, wherein the first judgment processing judges a timing at which the state of the object is changed to the predetermined state, based on a change of the position of the indicator sequentially detected by the detection processing with respect to respective photographed images sequentially acquired by the acquisition processing, and wherein the second judgment processing judges the state of the photographed image based on positions of the indicators detected by the detection processing with respect to a photographed image acquired by the acquisition processing at the timing judged by the first judgment processing.

* * * * *